United States Patent Office

Re. 27,025
Reissued Jan. 12, 1971

27,025

PROCESS OF CONDITIONING PARTICULATE MATERIALS *WITH AN ORGANOSILICON COATING* FOR USE IN ORGANIC EXPLOSIVES

Louis McDonald, Altadena, Calif., assignor to the United States of America as represented by the United States Atomic Energy Commission

No Drawing. Original No. 3,403,061, dated Sept. 24, 1968, Ser. No. 141,840, Feb. 1, 1950. Application for reissue June 25, 1969, Ser. No. 846,985

Int. Cl. C06b *19/02*

U.S. Cl. 149—7 7 Claims

Matter enclosed in heavy brackets [ ] appears in the original patent but forms no part of this reissue specification; matter printed in italics indicates the additions made by reissue.

*ABSTRACT OF THE DISCLOSURE*

*A method of forming a protective, water resistant film on finely divided solids by contacting the solids with a silane. The silane reacts with adsorbed water forming a water resistant polymeric, substituted silicon oxide on the particle surfaces.*

This invention relates to the dispersion of solids in organic liquids, and more particularly to the suspension of solids in melted organic explosives.

Fusible organic high explosives such as alpha-trinitrotoluene, picric acid and ammonium picrate are desirable materials for the loading of war heads, shells, bombs, mines and for the fabric of shaped charges and the like, in that these explosives are readily melted at moderately elevated but hazard-safe temperatures, and easily loaded by pouring into the proper cavity of the weapon. When the charge has cooled and solidified, the excess riser part can be readily and safely shaped and/or removed as desired.

Organic explosives of the class noted, however, are deficient in certain technical requirements, especially brisance, blast effect, and in some instances, detonation velocity. These undesirable qualities have been shown to be due to an unfavorable balance of the oxygen available within the explosive composition to the carbon dioxide potentially formed on the combustion of the explosive.

In ordnance practice, the deficiency in oxygen and in rate of detonation has been overcome by the incorporation of relatively large proportions of organic or inorganic explosive materials which function as oxidizing and/or boosting agents. Such materials as cyclotrimethylene trinitramine (RDX), pentaerythritol tetranitrate (PETN), ammonium nitrate, potassium nitrate, barium nitrate, lead nitrate, ammonium perchlorate and potassium perchlorate have long been used successfully with fusible organic explosives such as alpha-trinitrotoluene (TNT) to rectify the unfavorable oxygen balance.

An example of an explosive mixture which is capable of being adjusted to provide the proper brisance and detonation velocity is shown in a copending application Ser. No. 140,148, filed Jan. 23, 1950, *now U.S. Pat. No. 3,402,065,* of Louis McDonald and Norman A. MacLeod, entitled "Surface Conditioning Method." Other examples of well-known explosive compositions are Composition B or cyclotol (cyclotrimethylene trinitramine and TNT), amatol (ammonium nitrate and TNT), plumbatol (lead nitrate and TNT), kalotol (potassium nitrate and TNT), and pentolyte (pentaerythritol tetranitrate and TNT). Metal powders such as aluminum power are sometimes incorporated as a third component to obtain a further change in detonation characteristics.

In order to produce charges of such binary or tertiary explosives it is generally necessary to prepare a dispersion of the solid component or components such as barium nitrate in a readily fusible component such as TNT. Such dispersions, known as high explosive slurries, are frequently difficult to prepare, especially when amounts of oxidizer or booster materials sufficient to obtain optimum oxygen balance, brisance or blast effects are incorporated. As the ratio of the volume of solid to the volume of liquid approaches the critical value of 1:1, the slurry of the binary or tertiary explosive becomes exceedingly viscous and exhibits other unfavorable rheological properties such as high yield stress and pseudo plasticity or thixotropy. Such a slurry is difficult to pour and freezes in the form of an unsatisfactory charge of low density, containing defects such as pipes, cavities, and bubbles.

These undesirable conditions are especially prevalent when the dispersed components are of a sufficiently high specific surface, i.e., sufficiently finely divided, to form a polyphase system that is stable enough so that segregation of the solid and liquid component does not take place to any substantial extent during the interval required for pouring and for solidifying or freezing the charge. Such avoidance of segregation is essential to the proper performance of the composite explosive. It is thus apparent that if the solid additives are sufficiently finely divided so that the composite explosive system is stable the composition frequently cannot be satisfactorily loaded.

Certain physical properties of the solid additives are important in their effect upon the rheological properties of slurries of polycomponent explosives. Among these are (a) angle of contact between the melted organic high explosive and the surface of the solid additive, (b) the density of the additive, and (c) the difference in density between the liquid and solid components.

The contact angle of melted organic high explosive against most solid dispersible organic booster explosives is small or zero and accordingly, particles of solid organic boosters such as cyclotrimethylene trinitramine are dispersed without difficulty. The inorganic oxidizers, however, are ionic crystals against which melted organic explosives such as TNT and trinitrobenzene show large contact angles, for example, of the order of 100°, and the dispersion of these desirable additives therefore presents difficulties.

As in the case of other dispersions it has been found possible in some instances to increase the amount of dispersed solids by the use of suitable dispersing agents, in this instance, nitrocellulose, benzylcellulose, and other like macromolecules. Such agents are believed to perform their function by effecting a lowering of the angle of contact between the solid and liquid phases.

Especially when the dispersing agents do not function well, the weight of solid inorganic additive that can be dispersed to make a suitable binary explosive composition is small, particularly when the density of the solid component is low, as in the case of ammonium nitrate. The density of the additives is thus seen to be important, for the behavior of the dispersion is a function of the relative volume of solids and liquids and a larger weight of a more dense additive will be contained in a given volume. On the other hand, however, the greater the difference in density between the melted organic explosive and the additives, the more rapidly will the dispersed particles tend to settle out.

It is an object of this invention to provide a method for effectively dispersing inorganic or other difficultly dispersible solids in organic fluids.

It is further object of this invention to provide a method for dispersing finely divided additives in melted organic explosives.

It is a still further object of this invention to provide a method for producing composite high explosives such as amatol, baratol cyclotol and the like, of good explosive performance and satisfactory flow characteristics.

It is another object of this invention to provide a method for subdividing solid materials so that dispersing agents and the like may function effectively therewith.

It is yet another object of this invention to provide a method for treating subdivided solid materials to protect against deterioration, upon storage, of certain qualities, for example, dispersibility.

Still another object of this invention is to provide a method for stabilizing dispersions of a solid pulverulent material which is normally soluble to some extent in the dispersing medium.

A still further object of this invention is to provide the materials produced by the application of the above-mentioned methods.

Still other objects and features of this invention will become apparent from the description which follows.

The objects of this invention are achieved by treating the solid pulverulent materials before dispersion with at least one liquid or solid organic silicon compound of the general formula $$(R_1R_2R_3R_4)Si$$

where Si represents a silicon atom and where at least one but not more than three of the four substituents on the silicon atom, namely, $R_1$, $R_2$, $R_3$, and $R_4$, is chosen from the materials of the class consisting of alkyl, aryl, alkoxy and aryloxy groups, and the remainder of the four substituents, comprising at least one of said substituents, is chosen from the materials of the class consisting of halide, amino, hydroxy, alkoxy and aryloxy groups. The word pulverulent is defined as meaning "consisting of, or deducible to, fine powder . . ." in accordance with the definition given on p. 2011 of Webster's New International Dictionary (second edition, unabridged; Springfield, Mass., G. and C. Merriam Company, 1949). The organic residues alkyl, aryl, alkoxy and aryloxy groups are defined as including both substituted and unsubstituted such groups, but with reference to the first class cited above, only in such instances where any substituent or substituents do not destroy the essentially organic character of said group.

It has now been found that the minute layer of water which is readily and strongly adsorbed onto the surfaces of finely divided materials, especially inorganic materials such as the oxidizers desirable for the preparation of composite explosives gives rise to unfavorable rheological properties where said materials are dispersed in hydrophobic organic liquids, as in composite explosive slurries. In particular, the suitable dispersing agents, such as nitrocellulose and others mentioned above, do not function effectively in the presence of moisture adsorbed onto the additive particles. A freshly subdivided material possesses an especially active as well as extensive surface in contrast to the material as it existed in massive form prior to the effecting of such subdivision. Advantage is taken of this increase in extent and activity of surfaces upon subdivision in the preparation of surface catalysts and the like, where the highest possible value of specific surface (surface per unit weight) and activity are desired. It has been found that the adsorption of water on the surface of an additive becomes an especially troublesome problem only when the additive material is finely divided, as is required in the preparation of stable dispersions, for example, in organic, i.e., hydrophobic, liquids, for then the extent and character of the new surface cause a change in the order of magnitude of the amount of water adsorbed and in the effect of the water layer upon the behavior of the desired dispersion.

The drying of nonhygroscopic and moderately water soluble inorganic booster chemicals of high specific surface (equal to or greater than 0.05 square meter per gram), such as ground or ball-milled barium nitrate, to levels of water concentration representing adsorbed layers of the order of one molecule thick is exceedingly difficult, though not impossible to achieve. The drying of a hygroscopic nitrate such as ammonium nitrate or sodium nitrate to water concentrations equivalent to a monomolecular layer of water, and the maintenance of the water content at this level throughout the necessary handling operations and processing steps required for the preparation and loading of binary explosives is industrially unfeasible, if not virtually impossible. A further difficulty accrues from the requirement that the dispersed booster solid must have this relatively high (approximately 0.05 square meter per gram) specific surface in order to prevent the segregation of the solid component during the interval required to handle and freeze the binary explosive slurry.

In order to obtain material of the required specific surface, it is usually necessary to grind the solid component in a hammer mill, rod mill, ball mill or similar attrition device before incorporation in the slurry. During the grinding operation, the solid component even though it be nonhygroscopic, will readily adsorb a layer of one or more molecules of water from an atmosphere of, for example, 30 percent relative humidity at 20° C. The contamination of the newly formed crystal surfaces in this manner is rapid and sufficiently serious as to cause the slurry of the binary explosive made even with the freshly subdivided additive to exhibit rheological properties which make it undesirable for pour loading. Storage increases the severity of the problem.

The probable mechanism for the removal of water from the pulverulent materials with the subsequent formation of a protective water resistant film by the silane compound is shown in the following reactions:

$$R_{4-n}SiX_n + nH_2O \rightarrow R_{4-n}Si(OH_n) + nHX \qquad (1)$$

$$R_{4-n}Si(OH)_n \rightarrow R_{4-n}SiO_{n/2} + n/2H_2O \qquad (2)$$

where R represents substituents, not necessary alike, chosen from the materials of the first class of groups as given in the general formula above, and X represents substituents, not necessarily alike, chosen from the materials of the second class of groups of the general formula. The silicol produced in Reaction 1 is unstable and reacts further with the elimination of water, as in Reaction 2, to form an insoluble polymeric substituted silicon oxide and/or to attach itself to various active or reactive points on the surface of the pulverulent materials. The regenerated water, amounting to one-half that originally consumed in Reaction 1 is then removed as in Reaction 1. The overall reaction produces substituted silicon oxide units which polymerize and/or attach themselves to the additive particles, together with the substance HX, which, from the foregoing definition of X, will be a material from the group hydrogen halide, ammonia, water, alcohol, or phenol. The HX byproduct may be removed by a combination of elevated temperature, reduced pressure and/or a gas stream such as dry air. The water insoluble organosiloxane, of which $R_{4-n}SiO_{n/2}$ is a unit, is bonded to the particle surface by strong forces, for it can be removed readily only by treatment with strong acids or abrasives.

Of the preferred organosilicon compounds useful in treating particulate explosives, the methylchlorosilanes have been found to be especially desirable. Dimethyldichlorosilane is most effective and convenient to use because of its ready reactivity; other preferred alkylhalosilanes include ethylchlorosilanes and mixed methylethylchlorosilanes. Alkyl and alkoxy silane halides having alkyl groups larger than methyl show a decreasing order of suitability with an increase in the number of carbon atoms in the chain of the alkyl groups. Aryl silicon halides such as diphenyldichlorosilane, and alkyl-arylhalosilanes such as methyl- and ethyl-phenylhalosilanes are also useful, but because of their more viscous nature and lower reactivity are more conveniently employed at higher temperatures and in a diluent of carbon tetrachloride or in an excess of siloxane over that which is formed in the reaction.

Other silanes which can advantageously be empolyed are the amino substituted alkyl- or arylsilanes, and the alkoxysilanes, such as methoxy-tert.-butoxydiaminosilane and butoxychlorosilane. Tetraalkyl silicic acid esters, for example, these containing a total of less than about 20 carbon atoms, are usable though somewhat less desirable. Liquid silane compounds whose viscosity are not unduly high at room temperature or moderately elevated temperatures are conveniently employed for the direct surface conditioning of particulate explosives, while solid or more viscous liquid organosilicon compounds are more effectively applied to the surfaces of particulate explosive materials by other suitable methods. For example, the latter compounds may be applied in a solution of an inert solvent such as carbon tetrachloride, or in an excess of dimethylsiloxane or the like.

Some of the preferred embodiments of the organosilicon compounds of this invention may be expressed by the same general formula as given above, $$(R_1R_2R_3R_4)Si$$

where $R_1$ and $R_2$ are chosen from the materials of the class consisting of alkyl, aryl, alkoxy and aryloxy groups, as defined above, and $R_3$ and $R_4$ are chosen from the materials of the class consisting of halide, amino and hydroxy groups. It is to be understood, as is obvious to those skilled in the art, that it is possible to select more and less convenient embodiments of the general formula or of this preferred formula. For example, if groups of very low molecular weight, such as methyl, are chosen for $R_1$ and $R_2$, and $R_3$ and $R_4$ are chosen to be hydroxyl, then the organosilicon compound would enjoy only transitory existence and would, as it the usual practice in the chemical art with regard to such short-lived reagents, be conveniently formed in situ, for example, from the analogous compound in which $R_3$ and $R_4$ are halide or amino groups. On the other hand, if $R_1$ and $R_2$ are each phenyl, then the compound in which $R_3$ and $R_4$ are hydroxy groups is known to be stable and not inconvenient to employ in the process of this invention. It should be pointed out, however, that when removal of minute quantities of water is the primary objective in the application of the process of this invention, then to use hydroxyl groups as substituents $R_3$ and $R_4$ is less convenient than to use halide or amino groups. Further, the fluoride group is less convenient than is the chloride group, in the second class above, and bromide and iodide are more expensive and less stable and convenient. Many such features are well known to those skilled in the chemistry of these organosilicon compounds; further elaboration will not be made here.

Many further variations and modifications may obviously be made. Other preferred embodiments include silicon compounds with one or three organic substituent groups, especially as mixtures with the doubly substituted organosilicon compounds of the preceding paragraph. While the compositions disclosed are all suitable, it can readily be recognized that more convenient values of such process variables as time, temperature, and manner of treatment will be possible with preferred embodiments of the organosilicon agent. Again, many usable and several especially suited vehicles for use with the coating agents are available. Especially desirable is an organosilicon oxide polymer of low viscosity, such as dimethylsiloxane and the like. Suitably low viscosities are of the order of magnitude of not greater than about ten times the viscosity of water, and lower viscosity values, e.g., not over three times the viscosity of water, are preferable. These vehicles may contribute to the desired coating which the treating agent initiates, as, for example, by adsorption to the thin coating thus formed. Solution of the treating agent in the vehicle is not a requirement; dispersion serves the same purpose.

The method of the invention is especially adapted for coating such particulate explosive materials as barium nitrate, potassium nitrate or ammonium nitrate in a finely divided state with a siloxane layer to protect the surfaces against the adsorption of moisture. Materials so coated may be stored for long periods of time in atmospheres of high relative humidity without exhibiting any deleterious effects, due to the adsorption of water, when the additives are subsequently incorporated into trinitrotoluene for the preparation of explosive slurries.

The same particulate explosive materials ground to a like degree of particularity but uncoated with siloxane, and stored under the same conditions, are rendered unsuitable for use in binary explosives by adsorption of polymolecular layers of water.

The following examples of the method of coating the surface areas of pulverulent explosive materials with organosilicon compounds of the type described above are given for the purpose of illustration only and are not to be considered as limiting on the scope of the invention. The first example illustrates a preferred method whereby a liquid silane in a carrier of siloxane is permitted to react with and neutralize the moisture layer present on small particulate organic explosive materials.

EXAMPLE I

Wet cyclotrimethylene trinitramine is placed in a drying chamber and dried by vacuum filtration and evaporation. When the water content of the material has been reduced to an amount equivalent to a 10 to 20 molecule layer covering the surface of the material, as calculated from the known dimensions of the particles and of the water molecule, the vacuum is released and an amount of a solution of 30 parts of dimethyldichlorosilane in 70 parts of dimethylsiloxane calculated to be at least sufficient to replace all of the water is admitted into the chamber. The temperature of the atmosphere and the explosive is maintained at 20° C. A reaction takes place between the dimethyldichlorosilane and the water adsorbed on the surfaces of the explosive crystals which results in the formation of and deposition on the crystal surfaces of a protective film of dimethylsiloxane. Hydrogen chloride is formed as a volatile secondary reaction product and is removed by vacuum filtration and water washing. The cyclotrimethylene trinitramine (RDX) is now partially desensitized by virtue of the reduction of coefficient of friction and is ready for incorporation into trinitrotoluene without further treatment or additives for the formulation of Composition B or cyclotols. The explosive thus made will remain at a more constant composition throughout melting and freezing cycles than will a composition made from RDX which has not been conditioned, because the organic explosive compound is protected from the adverse effects of changes in particle size distributions by the solution and recrystallization of the RDX in the TNT. Cyclotol slurries prepared from siloxane coated RDX crystals show virtually no change in apparent viscosity during 24-hour intervals of heating and agitation, whereas control slurries prepared from untreated RDX show changes in apparent viscosity which amount to a 30 percent reduction in the first 6 hours of the cycle and an increase of the order of 200 percent during the balance of the cycle.

The following example illustrates a method for the incorporation of a siloxane coating on the surfaces of particulate organic explosives by the use of a chlorosilane in an inert solvent.

EXAMPLE II

Cyclotrimethylene trinitramine containing adsorbed moisture is treated by mixing the pulverulent material with a 2 percent solution of diphenyldichlorosilane in carbon tetrachloride. The amount of the diphenyldichlorosilane used is computed from the known dimensions of the particles and of the diphenylsiloxane molecule so as to provide a layer 10 to 20 molecules thick of diphenylsiloxane on the total surface of the organic explosive material treated. While the minimum amount of silane compound necessary is exactly determined by the amount of water present, the amounts suitable for treating apparently dry particulate additives containing only adsorbed moisture usually lie in the range from about 0.1 to 100 parts of silane per million parts of additive. This range is cited as being merely illustrative, and not as limiting, for the water content of the pulverulent additive does establish the exact lower limit of the silane requirement, if water removal be the objective.

The temperature of the system is maintained at about 50° C. for the time required effectively to coat the explosive particles with the siloxane compound, usually about 15 minutes. The excess carbon tetrachloride and the hydrogen chloride formed during the reaction are removed by washing with water and applying vacuum filtration. The phenylsiloxane coated explosive particles may then be incorporated with trinitrotoluene to formulate various explosive mixtures. The mixtures thus formed exhibit excellent rheological, stability and surveillance properties.

The following example illustrates an embodiment whereby inorganic infusible barium nitrate is treated with dimethyldichlorosilane dissolved in dimethylsiloxane by the method of the present invention.

EXAMPLE III

Two hundred pounds of barium nitrate which has been pulverized in a hammer mill to particles of 16 microns average diameter and of 0.05 percent water content are tumbled in a conical blender with 125 cubic centimeters of a solution of 30 percent dimethyldichlorosilane and 70 percent dimethylsiloxane for a period of 30 minutes at a temperature of 20°–25° C. By reaction of the dimethylsilane with the adsorbed water a continuous film of dimethylsiloxane is formed on the crystal surfaces. The dimethylsiloxane present as a diluent for dimethyldichlorosilane is adsorbed to the newly coated surfaces.

The treated barium nitrate is removed to a shelf dryer and held at 105° C. for 10 hours to remove hydrogen chloride. After drying, the coated barium nitrate can be stored at 20° C. at 30 percent relative humidity for periods as long as 60 days and yet remain satisfactory for the preparation of baratols by incorporation in molten TNT.

As another example of an embodiment of the method of the present invention, ammonium nitrate in a finely divided state may be treated with a substituted organic silane.

EXAMPLE IV

Ammonium nitrate delivered from a grinding apparatus is passed through an atmosphere of 70 percent relative humidity at 20° C. on a belt conveyer. The ammonium nitrate is placed in a ball mill where it is wet-milled with a 2 percent solution of diphenyldichlorosilane in carbon tetrachloride. The wetted mixture is permitted to mill for at least 15 minutes at room temperature or until a desired distribution of particle sizes is obtained. At this point the ammonium nitrate particles are coated with a waterproof and nonhygroscopic coating of diphenylsiloxane. The particles are dried under reduced pressure to remove the hydrogen chloride byproduct and the excess carbon tetrachloride carrier.

Another embodiment of the invention is shown in the following example in which the organic treating material is di-tert.-butoxydichlorosilane.

EXAMPLE V

Sodium nitrate is ball milled in a 2 percent solution of di-tert.-butoxydichlorosilane in carbon tetrachloride until a desired distribution of particle sizes is obtained. In about 30 minutes at 50° C. the particulate explosive mixture is coated with a nonhygroscopic layer of di-tert.-butoxysiloxane. The carbon tetrachloride is then removed together with the hydrogen chloride which was formed during the reaction by distillation under reduced pressure. The siloxane coated sodium nitrate is then ready for incorporation into explosive compositions.

As a further embodiment of the method of the invention, di-tert.-butoxydiaminosilane may be used as the organic substituted silicon compound as indicated in the following example.

EXAMPLE VI

One hundred pounds of dry barium nitrate at room temperature are ground in a pulverizing machine to an average particle size of about 10 microns in diameter. A small amount of the water usually present in air is unavoidably adsorbed onto the surfaces of the newly formed particles. The pulverized barium nitrate particles are then placed in a conical blender with 100 cubic centimeters of a solution of 30 percent di-tert.-butoxydiaminosilane and 70 percent di-tert.-butoxysiloxane and mixed for about 45 minutes at room temperature. During this time the di-tert.-butoxydiaminosilane reacts with the adsorbed water to form a continuous layer of di-tert.-butoxysiloxane on the particle surfaces. The di-tert.-butoxysiloxane present as the diluent for the substituted amino silane is adsorbed to the newly coated surfaces. The coated nitrate is dried by passing a stream of dehumidified air (−20° F. dew point) over the treated barium nitrate at 150° C. to remove the ammonia byproduct formed during the reaction. The pulverized nitrate so treated can be air classified, screened or stored for periods of time up to 60 days without deleterious effects, before incorporation with molten trinitrotoluene or other suitable organic explosives for the preparation of high explosive slurries having the desired properties.

Advantages of the present invention are manifold. By the process of the present invention, the surfaces of finely divided materials may be protected from the effects of moisture, and thus the reproducible preparation of uniform dispersions of solids in organic, i.e., hydrophobic, liquids throughout a wide range of compositions is made possible. One particularly important application of the present invention lies in the preparation of composite explosives, which enjoy utility in both the commercial and the military fields. The coating placed upon the surfaces of particles by this process may serve to protect the coating material from undesirable influences other than that of adsorbed moisture; for example, the coating may be utilized to decrease or eliminate solution of the dispersed material in the dispersion medium, or to reduce the sensitivity of an explosive material to friction. Many other applications of the process of this invention are readily apparent to those skilled in the pertinent arts, and the invention is not to be considered as being limited in scope by any illustrations or examples herein given, except as indicated in the appended claims.

In particular, the conditions, and methods of performing the process of this invention which have been given by way of illustration are not to be construed as limiting, but merely as illustrative of presently preferred embodiments. It is obvious to those skilled in the art that such process variables as the time, temperature, and specific manner of treatment may be varied widely, both separately and in combination, without departing from the spirit of the invention. For example, in chemical processes such as that of this invention, there is a general interrelationship of time and temperature. Smaller intervals of time are usually required for the completion of a process at relatively higher temperatures. It is therefore to be understood that times of from a few minutes to a few hours may be appropriate for carrying out the process of the instant invention, and that temperatures between about the temperature of melting ice and a temperature safely below the decomposition temperature of the material being treated and of the silicon compound are suitable for use in connection with various more or less readily converted silicon-bearing starting materials. Temperatures below the solidification point of water may be used with suitably reactive silicon compound such as methyltrichlorosilane, by employing suitable materials as a solvent, such as a mixture of toluene and acetone, capable of dissolving or dispersing the silicon compound, and also capable of dissolving small amounts, in water. It is to be further understood that the treating material of this invention, liquid at the temperature used, may be a liquid silicon chemical of the cited general formula, or may be a liquid or solid such chemical in solution or suspension in a liquid carrier which itself may be inert, or may contribute, for example, by adsorption to the desired coating.

What is claimed is:

1. In a process for preparing composite explosive slurries of adequate stability and flow characteristics and suitably high additive concentration, the steps which comprise treating solid pulverulent additives before dispersion in fused organic explosive with at least one organosilicon compound, in the liquid phase, of the formula $$(R_1R_2R_3R_4)Si$$

where Si represents a silicon atom and where at least one but not more than three of the four substituents on the silicon atom, namely, $R_1$, $R_2$, $R_3$, and $R_4$, is chosen from the materials of the class consisting of alkyl, aryl, alkoxy and aryloxy groups, and the remainder of the four substituents comprising at least one of said four substituents is chosen from the materials of the class consisting of halide, amino, hydroxy, alkoxy and aryloxy groups, at a temperature between about the temperature of melting ice and a temperature below the destructive thermal decomposition temperature of both the organosilicon starting materials and the pulverulent additive materials, for a period of time between about one-quarter hour and about six hours, said organosilicon compounds being employed in a liquid vehicle chosen from the materials of the class consisting of liquid said organosilicon compounds and liquid organosilicon oxide polymers, said silicon compounds having viscosities not substantially greater than about ten times the viscosity of water, and carbon tetrachloride, removing byproducts and excess materials including solvents from said treated additives, and dispersing said additives in fused organic explosive materials.

2. In a process of conditioning solid pulverulent additive materials for incorporation in the high explosive slurries, the steps which comprise treating said materials with dimethylidichlorosilane in the liquid phase, with the aid of a liquid vehicle chosen from the class consisting of said liquid organosilane compound, dimethylsiloxane, di-tert.-butoxysiloxane, and carbon tetrachloride, at a temperature of between about 20° C. and about 70° C. for a period of between about one-quarter hour and about one hour, removing byproducts and excess materials including solvents from said treated additives, and dispersing said additives in fused organic explosive materials.

3. The process as in claim 2, in which the organosilane compound employed is diphenyldichlorosilane.

4. The process as in claim 2, in which the organosilane compound employed is di-tert.-butoxydichlorosilane.

5. The process as in claim 2, in which the organosilane compound employed is di-tert.-butoxydiaminosilane.

6. A finely divided additive material adapted to be dispersed in a molten high explosive to form a slurry, the surfaces of which material are coated with a thin layer of a polymerized organosilicon oxide polymer derived from a monomeric organosilicon compound of the formula $$(R_1R_2R_3R_4)Si$$

where Si represents a silicon atom and where at least one but not more than three of the four substituents on the silicon atom, namely, $R_1$, $R_2$, $R_3$, and $R_4$, is chosen from the materials of the class consisting of alkyl, aryl, alkoxy and aryloxy groups, and the remainder of the four substituents comprising at least one of said four substituents is chosen from the materials of the class consisting of halide, amino, hydroxy, alkoxy and aryloxy groups.

*7. A finely divided solid pulverulent inorganic material, comprising a nitrate the surfaces of which material are coated with a thin layer of an organosilicon oxide formed by the reaction of an organosilicon monomer having the formula $R_{4-n}SiX_n$, wherein R is chosen from materials of the class consisting of alkyl, aryl, alkoxy and aryloxy groups, wherein X is chosen from materials of the class consisting of halide, amino, hydroxy, alkoxy and aryloxy groups and wherein n is at least 1 but not more than 3, with water adsorbed on the surface of said solid material according to the reaction*

$$R_{4-n}SiX_n + nH_2O \rightarrow R_{4-n}Si(OH)_n + nHX$$

*followed by conversion of unstable $R_{4-n}Si(OH)_n$ to $R_{4-n}SiO_{n/2}$ which is capable of polymerizing and reacting with active sites on said solid material.*

References Cited

The following references, cited by the Examiner, are of record in the patented file of this patent or the original patent.

UNITED STATES PATENTS

| | | |
|---|---|---|
| Re. 13,793 | 9/1914 | Bachrach. |
| 2,389,491 | 11/1945 | Dunlap et al. |
| 2,424,853 | 7/1947 | Stafford. |
| 2,469,625 | 5/1949 | Barry. |
| 2,474,704 | 6/1949 | Thayer. |
| 2,528,606 | 11/1950 | Pedersen. |

BENJAMIN R. PADGETT, Primary Examiner

U.S. Cl. X.R.

117—100; 149—5, 11, 18, 92, 105